May 19, 1936.  S. BRISKIN  2,040,917
HEAT EXCHANGE DEVICE
Filed April 30, 1935
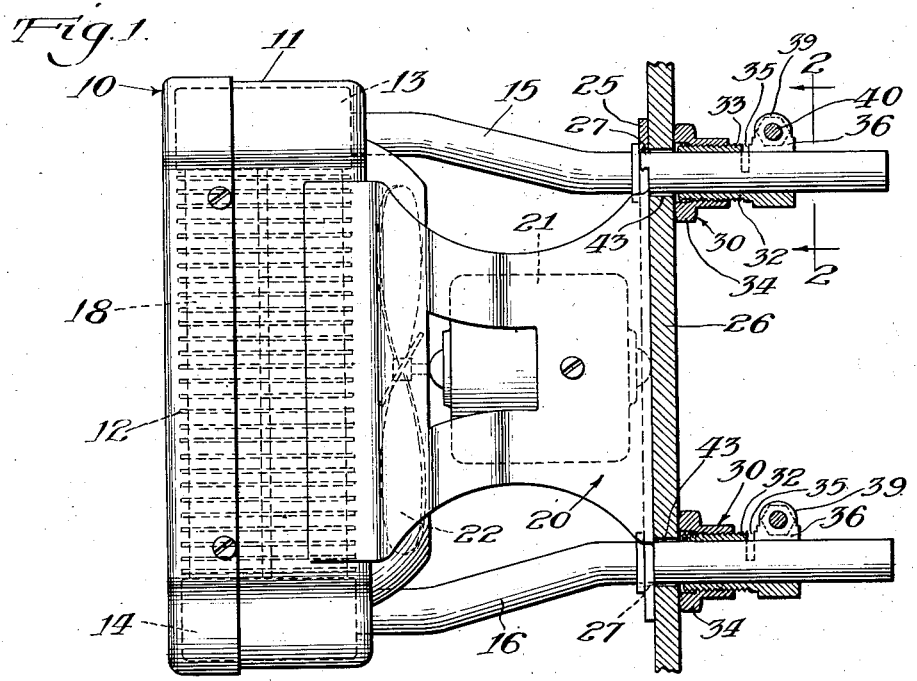
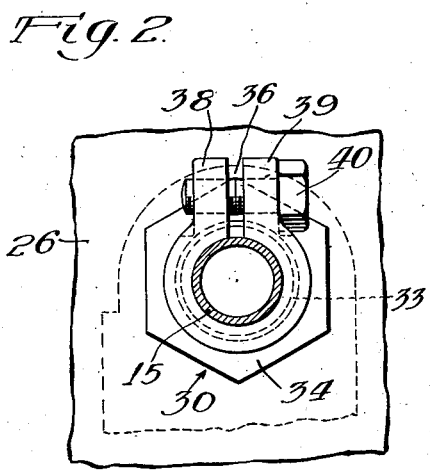
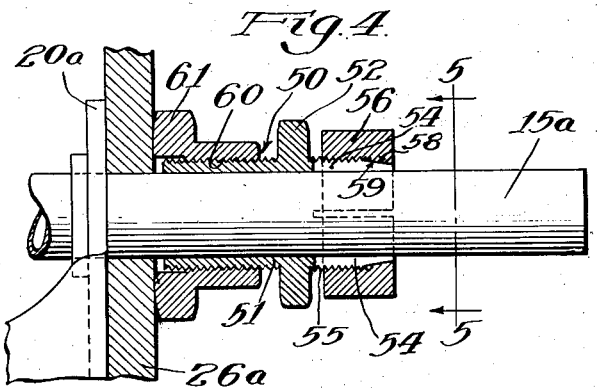
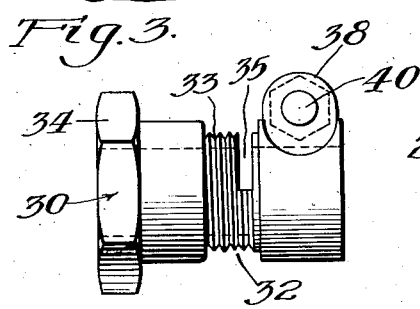
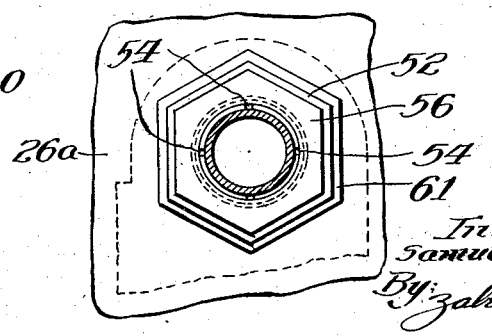
Inventor:
Samuel Briskin Patented May 19, 1936

2,040,917

UNITED STATES PATENT OFFICE 2,040,917

HEAT EXCHANGE DEVICE

Samuel Briskin, Chicago, Ill., assignor to Excel Auto Radiator Company, a corporation of Delaware Application April 30, 1935, Serial No. 19,018

1 Claim. (Cl. 248—2)

The invention relates to heat exchange devices and particularly to means for mounting such devices on the dashboard, or the equivalent, of an automobile.

A primary object of the invention is to provide a heat exchange device for use in connection with the cooling systems of automobile engines, which device will comprise improved means for securing it to the dashboard of an automobile.

Other objects and advantages will become apparent as the following detailed description progresses, reference being had to the accompanying drawing, wherein Fig. 1 is a side elevation, partly in section, of a heat exchange device embodying the invention, the device being shown in connection with an automobile dashboard which is shown in section.

Fig. 2 is an enlarged fragmentary section taken on line 2—2 of Fig. 1.

Fig. 3 is a side elevation of a fastening or clamping device forming part of the heat exchange device shown in Fig. 1.

Fig. 4 is a fragmentary longitudinal section taken through a fastening or clamping device embodying another form of the invention, the fastening or clamping device being shown in connection with an automobile dashboard and with a bracket forming part of an automobile heater, and Fig. 5 is a section taken on line 5—5 of Fig. 4.

Referring for the present to Figs. 1 to 3, inclusive, wherein a preferred embodiment of the invention is illustrated, the reference character 10 designates generally an automobile heater of the type usually employed in connection with the cooling system of an automobile to heat the interior of the automobile. The automobile heater 10 comprises a sheet metal housing 11 which encloses a radiator core 12 preferably formed of sheet metal. The radiator core 12 comprises upper and lower headers 13 and 14, respectively, which are connected to the cooling system of an automobile by bent tubes 15 and 16, respectively. The headers 13 and 14 communicate with each other through sheet metal tubes 18 forming part of the radiator core 12. The housing 11 and the core 12 are carried by a bracket 20 which also carries an electric motor 21 provided with a fan 22 adapted to advance air through the spaces between the tubes 18 so that there will be an exchange of heat between the air and the heated fluid passing through the tubes 18. The electric motor 21 is connected to the electrical system of the automobile by any suitable means (not shown).

Referring to Fig. 1 it will be noted that the bracket 20 is formed with a flange 25 adapted to abut against one face of a dashboard 26 forming part of the automobile. The flange 25 is provided with apertures 27 through which the tubes 15 and 16 pass.

Mounted on the tubes 15 and 16 and abutting against the dashboard 26 are improved fastening or clamping devices 30 which co-operate with the flange 25 to clamp the tubes 15 and 16, and therefore the heater 10, to the dashboard 26. Each fastening or clamping device 30 preferably comprises a sleeve 32 having screw threads 33 upon which a nut 34 is screw threaded, the nut 34 and one end of the sleeve 32 being adapted to abut against the dashboard 26. Each sleeve 32 has a slot 35 extending transversely thereof and a slot 36 extending longitudinally thereof. The slot 36 extends from the slot 35 to that end of the sleeve not abutting against the dashboard 26. At the sides of the slot 36 are lugs 38 and 39 formed integral with the sleeve 32. A bolt 40 extends through the lug 39 and is screw threaded into the lug 38. It will be readily understood that if the bolt 40 is manipulated in the proper direction, it will draw the lugs 38 and 39 toward each other so that the slotted end of the sleeve 32 will clamp itself upon the corresponding tube 15 or 16.

When the heater 10 is to be mounted on the dashboard 26, the heater is placed in the position wherein it is shown in Fig. 1 so that the tubes 15 and 16 extend through apertures 43 formed in the dashboard. The bracket 20 is urged against one face of the dashboard 26 and the fastening devices 30 are slipped over the ends of the tubes 15 and 16 and brought approximately into the positions wherein they are shown in Fig. 1 so that the nuts 34 and the adjacent ends of the sleeves 32 abut against the dashboard. The bolts 40 are then manipulated to clamp the sleeves 32 on the tubes 15 and 16 after which the nuts 34 are rotated so that the screw threads 33 will cause them to advance against the dashboard until the nuts co-operate with the flange 25 to secure the heater 10 rigidly to the dashboard.

In Figs. 4 and 5, another form of the invention is shown. The reference character 50 designates generally a fastening or clamping device which may be employed in place of the fastening or clamping device 30. Each fastening or clamping device 50 comprises a sleeve 51 having a polygonal flange or head 52 intermediate its ends so that a wrench may be applied thereto to hold the sleeve against rotation when it is mounted on a tube 15a which corresponds to the tube 15 described above. One end of the sleeve 51 is provided with longitudinal slots 54 and is screw threaded as at 55 to receive a nut 56 having a frustro-conical surface 58 adapted to engage a similar surface 59 formed on the slotted end of the sleeve 51. It will be readily understood that if the nut 56 is rotated relative to the sleeve 51 in the proper direction, the frusto-conical surface 58 will ride up on the frusto-conical surface 59 and cause this slotted end of the sleeve 51 to contract against the tube 15a so that the sleeve 51 will be clamped thereto.

The other end of the sleeve 51 is provided with screw threads 60 upon which a nut 61 is screw threaded. It will be noted that the last-mentioned end of the sleeve 51 and one surface of the nut 61 are adapted to abut against a dashboard 26a and to co-operate with a bracket 20a to clamp the bracket 20a to the dashboard 26a. The bracket 20a corresponds to the bracket 20 described above and is substantially identical in construction and function.

When the bracket 20a is to be secured to the dashboard 26a, the tube 15a and the tube corresponding to the tube 16 described above (but not shown) are passed through suitable apertures in the dashboard 26a and the bracket 20a is forced against the dashboard. The fastening devices 50 are then passed over the free ends of the tube 15a and the tube corresponding to the tube 16 described above. After the nuts 61 and the adjacent ends of the sleeves 51 have been brought into positions wherein they abut against the dashboard 26a, the nuts 52 are tightened to clamp the sleeves 51 upon their tubes. The nuts 61 are then rotated to urge them more firmly against the dashboard 26a.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

I claim:

Means for securing an automobile heater to a vehicle dashboard comprising a supporting member attached to the heater and abutting against one side of a dashboard and having a tube extending through the dashboard, a slotted sleeve on said tube having a smooth frusto-conical end portion, a nut screw threaded on said sleeve and having a smooth frusto-conical bore portion to wedgingly engage the similarly shaped end portion of the sleeve for compressing the sleeve into engagement with said tube, and a second nut screw threaded on said sleeve for clamping said dashboard between the second nut and said supporting member.

SAMUEL BRISKIN.